Patented Oct. 10, 1944

2,360,301

UNITED STATES PATENT OFFICE 2,360,301

PROCESS FOR PRODUCING PHENYL-
ACETALDEHYDE

William S. Emerson, Dayton, Ohio, assignor to Monsanto Chemical Company, a corporation of Delaware No Drawing. Application November 26, 1942,
Serial No. 467,047

12 Claims. (Cl. 260—599)

This invention relates to the manufacture of phenylacetaldehyde.

An object of this invention is to provide a new process of producing phenylacetaldehyde by splitting off alcohol from beta-phenyl vinyl ethers, ethers of beta-phenyl ethylidene glycol, or a mixture of the same by leading the vapors thereof over heated acidic catalysts.

In the prior art, phenylacetaldehyde has been prepared by a variety of methods, but these have not been applicable to the production of the aldehyde on a commercial scale. For example, according to Whitmore (Organic Chemistry, 1937, p. 794), phenylacetaldehyde is best prepared from cinnamic acid by first adding hypochlorous acid and then rearranging and decarboxylating the product. This method, however, is of little practical importance in that cinnamic acid, itself, is not readily available and that the yields of phenylacetaldehyde obtainable from the same are of a low order. Also, according to the literature (Ber. 14, 1868, Ber. 38, 1963, Ann. 308, 270) phenylacetaldehyde is obtainable by refluxing styryl alkyl or aryl ethers with water in the presence of dilute sulfuric acid. Yields concerning the extent of such conversion are not reported in the literature, but I have attempted the preparation of phenylacetaldehyde by refluxing ethyl styryl ether with water in the presence of dilute sulfuric acid, and have been able to obtain at best only a 40% conversion of the ether into phenylacetaldehyde.

Now I have found that the production of phenylacetaldehyde from styryl alkyl ethers or phenylacetaldehyde diacetals is considerably simplified by conducting the reaction under conditions which will be hereinafter described. I have also found instead of using pure styryl alkyl ethers or the pure dialkyl ethers of beta-phenyl-ethylidene glycol as the initial materials in the production of phenylacetaldehyde, I may employ mixtures of the same, for example, the mixture of styryl ethyl ether and phenylacetaldehyde diethyl acetal which is obtainable by reacting ethanol with a side-chain chlorination product of styrene. The employment of such a crude mixture as starting material for the production of phenylacetaldehyde is of decided commercial interest in that thereby is provided a more economically valuable method for the manufacture of this aldehyde than has been heretofore proposed.

Beginning with styrene, phenylacetaldehyde may be obtained by the process of the present invention according to the following series of reactions:

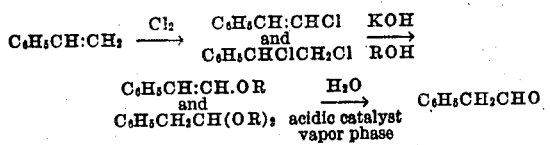

Based on styrene, yields of up to 75% of phenylacetaldehyde are obtainable.

As far as I have been able to ascertain, the conversion of the ether-acetal mixture into phenylacetaldehyde by passage of said mixture in the vapor state together with steam over an acidic catalyst has not been described in the prior art. Likewise, the conversion of a substantially pure styryl alkyl ether or substantially pure phenylacetaldehyde diacetal into phenylacetaldehyde by vapor phase hydrolysis in the presence of an acidic catalyst is new and surprising, for it has been reported by Sigmund and Uchann (Monatshefte 51, 234–52 (1929)) that when phenylacetaldehyde dimethyl or di-n-propyl acetal is passed over a catalyst consisting of brass shavings or clay at increased temperature, the product is a mixture of unreacted acetal and either methyl or propyl styryl ether.

I have found, however, that in the presence of an acidic catalyst and steam, 2 molecules of alcohol are cleaved from phenylacetaldehyde diacetal or 1 molecule of alcohol is cleaved from a styrene alkyl ether, phenylacetaldehyde being the product in each case.

In practice I prefer to operate as follows: I pack a quartz tube having an internal diameter of, say, 1 inch and length of, say, 18 inches with an acidic catalyst, for example, silica, an acid-impregnated silica, or an acid-impregnated pumice. I apply external heat, raising the temperature of the interior of the tube to from 150° C. to 500° C., preferably to from 175° C. to 250° C. Into the catalyst tube I then introduce through one conductor the volatilized ether or the volatilized ether-acetal mixture, and through another conductor an excess of superheated steam. Instead of the volatilized reactants, I may employ the liquid ether, or the liquid ether-acetal mixture; in this case, however, I apply heat to the conducting tube in such a manner as to volatilize the reactants before they enter the catalyst tube. When operating on a small scale, the liquid reactants may also be dropped very slowly at the top of the catalyst chamber, volatilization of the liquid occurring before it comes into contact with the catalyst. The rate at which the steam and the ether or ether-acetal mixture is passed through the catalyst tube depends upon the heat capacity of the plant. In laboratory experiments, employing the catalyst tube described above I find that very good results are obtainable by passage of the styryl ether or ether-acetal mixture at the rate of, say, 1 g. per from 30 to 120 seconds. In selecting both the optimum temperature and the optimum rate of addition of the reactants, care must be observed to maintain both rate and temperature high enough to avoid condensation and low enough to avoid the formation of tarry products in the catalyst chamber.

Also, care must be observed to prevent prolonged contact of the liquid reactants with the steam; that is volatilization of the ether or the ether-acetal mixture should take place immediately after it comes into contact with the steam, since admixture of steam with either the ether or the ether-acetal mixture in the liquid state results in the formation of tar. For this reason, reaction cannot be effected by passage of steam through the liquid prior to its introduction at the top of the catalyst tube.

The conversion of styryl alkyl ethers or of phenylacetaldehyde acetals or mixtures of the same into phenylacetaldehyde by hydrolysis of the same in the vapor state cannot be effected in the absence of an acidic catalyst. While I am aware that a process for the manufacture of aliphatic aldehydes by the pyrolysis of alkyl vinyl ethers, e. g., methyl vinyl ether, has been described by Hasche and Thompson in U. S. Patent No. 2,294,402, the present process differs essentially from that of Hasche and Thompson in that these investigators do not necessarily employ a catalyst, since their process which involves a rearrangement of the unsaturated ether into an aldehyde, does not require the use of a catalyst of hydrolysis.

The invention is illustrated by the following examples:

Example 1

I prepare a mixture comprising approximately 50 parts of ethyl styryl ether and 50 parts of phenylacetaldehyde diethyl acetal by first chlorinating styrene to yield a mixture of beta-chlorostyrene and styrene dichloride and then reacting this mixture with ethanol in a bomb in the presence of potassium hydroxide, conversion of styrene to the ether-acetal mixture progressing substantially according to the schemes:

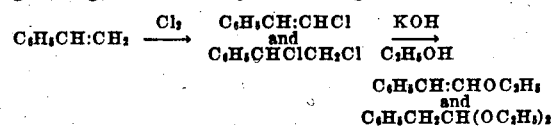

27 g. of the ether-acetal mixture obtained according to the above scheme was then passed through a quartz tube during a time of 1.75 hours at a temperature of 190–210° C. and a pressure of 115 to 140 mm. of mercury over a catalyst comprising sodium bisulfate on silica. Simultaneously an excess of steam was introduced into the reaction tube. At the end of the run, steam was led through the catalyst chamber for approximately ten minutes in order to drive out any retained reaction products or reactants. The contents of the receiving flask was extracted 3 times with benzene. The benzene extract was combined with washings obtained by treatment of the interior of the catalyst tube with 3–25 cc. portions of benzene, and the whole was distilled under partial vacuum, 14 g. of a fraction, B. P. 89–92°/20 mm., $n_D^{25}$ 1.5226, being obtained. This fraction was characterized as substantially pure phenylacetaldehyde through preparation of its 2,4-dinitrophenylhydrazone.

Example 2

I prepared a mixture comprising approximately 50 parts of methyl styryl ether and 50 parts of phenylacetaldehyde dimethyl acetal by first chlorinating styrene to yield a mixture of beta-chlorostyrene and styrene dichloride and then reacting this mixture with methanol in a bomb in presence of caustic soda, substantially according to the scheme shown in Example 1 for the preparation of the analogous ethyl mixture.

20 g. of the ether-acetal mixture thus prepared was then passed through a quartz tube packed with pumice which had been impregnated with phosphoric acid by admixing 25 cc. of 85% $H_3PO_4$ with 90 cc. of pumice and drying the mixture on an asbestos gauze over an open flame. Simultaneously an excess of steam was introduced into the catalyst chamber. The temperature of the reaction tube was from 210° C. to 235° C., a pressure of 100–115 mm. of mercury was maintained within the tube, and the time of passage of the ether-acetal mixture through the catalyst chamber was 35 minutes. At the end of this time, the reaction tube was steamed and then washed out with benzene, the benzene washings being combined with the benzene extract of the distillate. Upon distillation of the whole under partial vacuum there was obtained 11 g. of substantially pure phenylacetaldehyde, B. P. 82° C.–90° C./16 mm., $n_D^{26}$ 1.5260.

Example 3

This example shows the vapor phase transformation of styryl ethyl ether into phenylacetaldehyde.

25 g. of styryl ethyl ether was passed through a silica-packed quartz tube at a temperature of 215–225° C. and a pressure of 135–150 mm. of mercury for a time of 45 minutes. Simultaneously steam was introduced into the catalyst tube. At the end of the run steam was led through the tube for 15 minutes in order to drive out any retained reaction products or reactants. The catalyst tube was then cooled and washed with 50 cc. of benzene, and the washings were combined with the benzene extract of the distillate. The whole was distilled under partial vacuum, and there was obtained 15 g. (74% yield) of substantially pure phenylacetaldehyde, B. P. 85° C.–95° C./17 mm., $n_D^{26}$ 1.5263.

In the above examples reaction was effected under reduced pressure. Although I find that better conversion to phenylacetaldehyde is obtained by reaction under diminished pressure, good yields are also obtainable when employing atmospheric or even superatmospheric pressures, the amount of pressure employed varying with the type of reaction equipment employed. On a small laboratory scale, however, I find that the high vapor pressure of the reactants recommends the use of diminished pressure.

I may use any styryl alkyl ether and any acetal of phenylacetaldehyde as initial materials in the production of phenylacetaldehyde according to the present invention. However, since in the hydrolysis the alcohol which corresponds to the alkyl group of the ether or acetal is one of the reaction products, I prefer to employ materials which upon hydrolysis yield readily volatilizable alcohols in order that I may thereby prevent the accumulation of gummy or waxy deposits of the higher alcohols in the equipment. For this reason I prefer to employ styryl alkyl ethers in which the alkyl group contains from 1 to 8 carbon atoms and acetals of phenylacetaldehyde with alcohols containing the corresponding number of carbon atoms, for example, styryl methyl ether, styryl ethyl ether, styryl butyl ether, styryl hexyl ether, etc., or mixtures of the same with phenylacetaldehyde dimethyl-, diethyl-, dibutyl-, dihexyl-acetal, etc.

What I claim is:

1. The process for producing phenylacetaldehyde which comprises reacting in vapor phase ethers selected from the class consisting of beta-phenylvinyl ethers and beta-phenylethylideneglycol ethers with steam in the presence of an acidic catalyst.

2. The process for producing phenylacetaldehyde which comprises reacting in vapor phase alkyl ethers, in which the alkyl group contains from 1 to 8 carbon atoms, said ethers being selected from the class consisting of beta-phenylvinyl alkyl ethers and beta-phenylethylideneglycol alkyl ethers, with steam in the presence of an acidic catalyst.

3. The process for producing phenylacetaldehyde which comprises reacting in vapor phase beta-phenylvinyl methyl ether with steam in the presence of an acidic catalyst.

4. The process for producing phenylacetaldehyde which comprises reacting in vapor phase beta-phenylethylideneglycol methyl ether with steam in the presence of an acidic catalyst.

5. The process for producing phenylacetaldehyde which comprises reacting in vapor phase beta-phenylvinyl ethyl ether with steam in the presence of an acidic catalyst.

6. The process for producing phenylacetaldehyde which comprises reacting in vapor phase beta-phenylethylideneglycol diethyl ether with steam in the presence of an acidic catalyst.

7. The process for producing phenylacetaldehyde which comprises reacting a mixture of a beta-phenylvinyl ether and a beta-phenylethylideneglycol ether with steam in the presence of an acidic catalyst.

8. The process defined in claim 7 in which the reaction is conducted at sub-atmospheric pressure.

9. The process defined in claim 7, in which the reaction is conducted at a temperature below 500° C.

10. The process defined in claim 7 in which the mixture of ethers consists of the reaction product of styrene chlorides with alcohols.

11. The process for producing phenyl acetaldehyde which comprises chlorinating styrene to produce a mixture of side-chain chlorination products, reacting said mixture with a lower alcohol to produce a mixture of ethers, and thereupon reacting in vapor phase said ethers with water vapor in contact with an acidic catalyst to produce phenyl acetaldehyde.

12. The process defined in claim 11 in which the lower alcohol is selected from the class consisting of: methyl alcohol and ethyl alcohol.

WILLIAM S. EMERSON.